(12) United States Patent
Blass et al.

(10) Patent No.: US 11,106,549 B2
(45) Date of Patent: Aug. 31, 2021

(54) SECURE AND ENCRYPTED LOGGING SYSTEMS AND METHODS WITH DATA RECOVERY

(71) Applicants: AIRBUS DEFENCE AND SPACE GMBH, Taufkirchen (DE); NORTHEASTERN UNIVERSITY, Boston, MA (US)

(72) Inventors: Erik-Oliver Blass, Munich (DE); Guevara Noubir, Brookline, MA (US)

(73) Assignees: Airbus Defence and Space GmbH, Taufkirchen (DE); Northeastern University, Boston, MA (US)

( * ) Notice: Subject to any disclaimer, the term of this patent is extended or adjusted under 35 U.S.C. 154(b) by 310 days.

(21) Appl. No.: 16/278,418

(22) Filed: Feb. 18, 2019

(65) Prior Publication Data

US 2020/0264958 A1    Aug. 20, 2020

(51) Int. Cl.
   *G06F 21/60*   (2013.01)
   *G06F 11/14*   (2006.01)
   *G06F 21/62*   (2013.01)

(52) U.S. Cl.
   CPC ........ *G06F 11/1471* (2013.01); *G06F 21/602* (2013.01); *G06F 21/6227* (2013.01)

(58) Field of Classification Search
   CPC ............... G06F 11/1471; G06F 21/602; G06F 21/6227; G06F 21/64; G06F 21/6218; H04L 63/12; H04L 9/0618; H04L 63/0428
   See application file for complete search history.

(56) References Cited

U.S. PATENT DOCUMENTS

| | | | |
|---|---|---|---|
| 2005/0129247 A1* | 6/2005 | Gammel | G06Q 20/341 380/286 |
| 2007/0150724 A1* | 6/2007 | Lin | G06F 21/6218 713/155 |

(Continued)

FOREIGN PATENT DOCUMENTS

EP    3 163 789 A1    5/2017

OTHER PUBLICATIONS

Goodrich et al., "Invertible Bloom Lookup Tables," arXiv:1101.2245v3 [cs.DS], pp. 1-24, Oct. 4, 2015.

(Continued)

*Primary Examiner* — Meng Li
(74) *Attorney, Agent, or Firm* — Jenkins, Wilson, Taylor & Hunt, P.A.

(57) ABSTRACT

Secure logging systems and methods using cryptography and/or encryption with crash recovery. In some embodiments, the secure logging system includes an initialization module to initialize cells of a logging database, including inserting a pseudorandom number into each cell of the logging database. In some embodiments, the secure logging system includes an addition module to encrypt new log messages and add them to the logging database in a given number of pseudorandom cells of the logging database. In some embodiments, the secure logging system includes a listing module to determine where in the logging database the log message was stored and then to decrypt the encrypted log messages. These systems and methods improve computer related technology including by improving crash reconstruction, root cause analysis, network systems security, and logging system encryption and security.

19 Claims, 9 Drawing Sheets

(56) References Cited

U.S. PATENT DOCUMENTS

2013/0046765 A1* 2/2013 Vemula ................ G06F 16/951
　　　　　　　　　　　　　　　　　　　　　　　　　707/741
2019/0306132 A1* 10/2019 Le Van Gong ....... H04L 63/068

OTHER PUBLICATIONS

European Search Report for Application No. 20158018.0 dated Jun. 12, 2020.
Accorsi, "Safe-Keeping Digital Evidence with Secure Logging Protocols: State of the Art and Challenges", IT Security Incident Management and IT Forensics, 2009. IMF '09. Fifth International Conference on, IEEE, Piscataway, NJ, USA, (Sep. 15, 2009) pp. 94-110.
Waters et al., "Building an Encrypted and Searchable Audit Log," 11th Annual Network and Distributed System Security Symposium, May 1, 2004, Section 5.1.
European Office Action for Application No. 20158018.0 dated Jun. 18, 2021.

* cited by examiner $$AM = \begin{array}{c} \phantom{AM=} \\ \phantom{AM=} \end{array} \begin{array}{cccc} & \multicolumn{3}{c}{M} & \\ C_1 & C_2 & \ldots\ C_n & H \\ \end{array}
\begin{bmatrix} 0 & 0 & \ldots & H_n[1] \\ \vdots & 1 & \vdots & \vdots \\ 0 & 0 & & \\ 1 & \vdots & & \\ 0 & 0 & & \\ \vdots & 1 & & \\ 0 & 0 & & \\ 1 & \vdots & & \\ 0 & & & \vdots \\ \vdots & & & H_n[m] \end{bmatrix}$$

FIG. 6B

SECURE AND ENCRYPTED LOGGING SYSTEMS AND METHODS WITH DATA RECOVERY

TECHNICAL FIELD

The subject matter disclosed herein relates generally to logging systems and methods. More particularly, the subject matter disclosed herein relates to secure and encrypted logging systems and methods with data recovery.

BACKGROUND

Modern computer systems, including but not limited to aircraft control systems, computer networking equipment, mobile phones, and personal computers, utilize logging systems to report and keep track of events that the computer systems encounter while performing their functions. Some of these logging systems report normal operations while others report alarms, security breaches, and/or crashes. In some instances, the computer system, and thus, possibly the logging system as well, can experience a security breach by an adversary system, or hacker. In some cases where an adversary system breaches the computer system's protections (firewalls, etc.), such as when intending to do harm to the computer system, the adversary system operates in such a way that it remains undetected.

For example, in some cases, an adversary system could be designed to infiltrate the computer system, tamper with it in some way or cause some harm (such as a crash), remove any evidence of the adversary's presence in the computer system by deleting or otherwise tampering with the logs stored by the logging system, and then abscond from the computer system without a trace. In such a case, the most likely scenario would be that the adversary system would either delete all of the logs stored in the logging system, delete only the most recent logs that correspond to the time that the adversary was attacking the computer system, or only delete or tamper with the relevant logs that evidence the adversary's presence in the computer system. Under these scenarios, not only would the adversary be undetected, but also any logs that evidence the issue caused by the adversary could be corrupted or deleted thereby making it difficult to diagnose any underlying system issues caused by the adversary or possibly even issues present on the system prior to the adversary's breach.

Moreover, similar issues can arise with respect to corrupted or lost logging data following a crash of the computer system caused by some other issue besides a breach by an adversary system (power outage, parity error, etc.).

SUMMARY

The subject matter of the present disclosure attempts to address or alleviate some of the issues described above by disclosing an encrypted and secure logging system with a logging data recovery feature. By securely encrypting the logging data, any adversary that breaches the computer system and attempts to read the logging data will be unable to, and the adversary's breach can be indicated in the logging file. Also, by including the logging data recovery feature, it becomes possible to not only discover that an adversary was present in the system, but also potentially diagnose what issues lead to the computer system corruption, crash, or other fault. Some of these techniques realize the concepts of forward confidentiality and forward integrity. Forward confidentiality is the notion that an adversary/hacker cannot learn anything about data added to the logging database of the present disclosure before the time of compromise, or before the time of the hack or breach. Forward integrity on the other hand speaks to a concept wherein attempted modifications by the adversary/hacker will not have an effect on the outcome of some of the modules described herein, specifically with regard to data items/log messages added before the time of compromise.

In accordance with this disclosure, systems and methods for securely encrypting logging data with a logging data recovery feature are provided herein. In one aspect, a secure logging system comprises: one or more computing systems comprising one or more processors, non-transitory computer readable medium, and executable instructions; a logging database comprising one or more cells; an initialization module, implemented by the one or more processors, wherein the one or more processors are configured to initialize each cell of the logging database with pseudo-random numbers based in part on a first random cryptographic key; an addition module, implemented by the one or more processors, wherein the one or more processors are configured to add encrypted data items to the cells of logging database, wherein the encrypted data items are encrypted using an indexed random cryptographic key; and a listing module, implemented by the one or more processors, wherein the one or more processors are configured to decrypt the encrypted data entries using the indexed random cryptographic key and transmit unencrypted data entries from the logging database to a display for user inspection after a logging system crash or breach of the logging system by an adversary system.

The present subject matter significantly improves computer and computer related technology, including the technological fields of computer system crash (or similar event) reconstruction, computer system logging, computer system breach detection, and logging system data security and recovery. The subject matter herein improves all of these fields by providing encryption, security, and recovery features to computer logging systems that enable system analysts and engineers to detect adversaries or hackers, diagnose the cause of a crash and other faults, and recover logging data after an adversary or crash has deleted or corrupted the logging data contents.

Although some of the aspects of the subject matter disclosed herein have been stated hereinabove, and which are achieved in whole or in part by the presently disclosed subject matter, other aspects will become evident as the description proceeds when taken in connection with the accompanying drawings.

BRIEF DESCRIPTION OF THE DRAWINGS

Features and advantages of the present subject matter will be more readily understood from the following detailed description which should be read in conjunction with the accompanying drawings that are given merely by way of explanatory and non-limiting example, and in which:

FIG. 6B illustrates an example matrix used in some embodiments by the listing module to solve a system of linear equations in order to decrypt the encrypted logging messages.

DETAILED DESCRIPTION

The present subject matter provides systems and methods for an encrypted and secure logging service with a data recovery feature. In one aspect, the present subject matter provides systems and methods for encrypting log messages on a computer system, such that an adversary trying to compromise the system can neither read nor tamper with old log entries without being detected. Additionally, the present subject matter provides for recovering at least the log messages that were obtained or received prior to the adversary's breach, corruption, or detection.

As described hereinabove, the present subject matter significantly improves computer and computer related technology, including the technological fields of computer system crash (or similar event) reconstruction, computer system logging, computer system breach detection, and logging system data recovery. The present subject matter improves all of these fields by providing encryption, security, and recovery features to computer logging systems that enable system analysts and engineers to detect adversaries, diagnose the root cause (root cause analysis) of a crash and other faults, and recover logging data after an adversary or crash has deleted or corrupted the logging data contents. By employing the subject matter herein, engineers and technicians can significantly improve their chances of determining the root cause and symptoms of crashes and other events that would otherwise be deleted or compromised by the adversary. Additionally, the encrypted log messages make it much more difficult for the adversary to obtain potentially sensitive information, and, thus, improves the security and performance of the computer running the system of the present disclosure.

Figure 1:
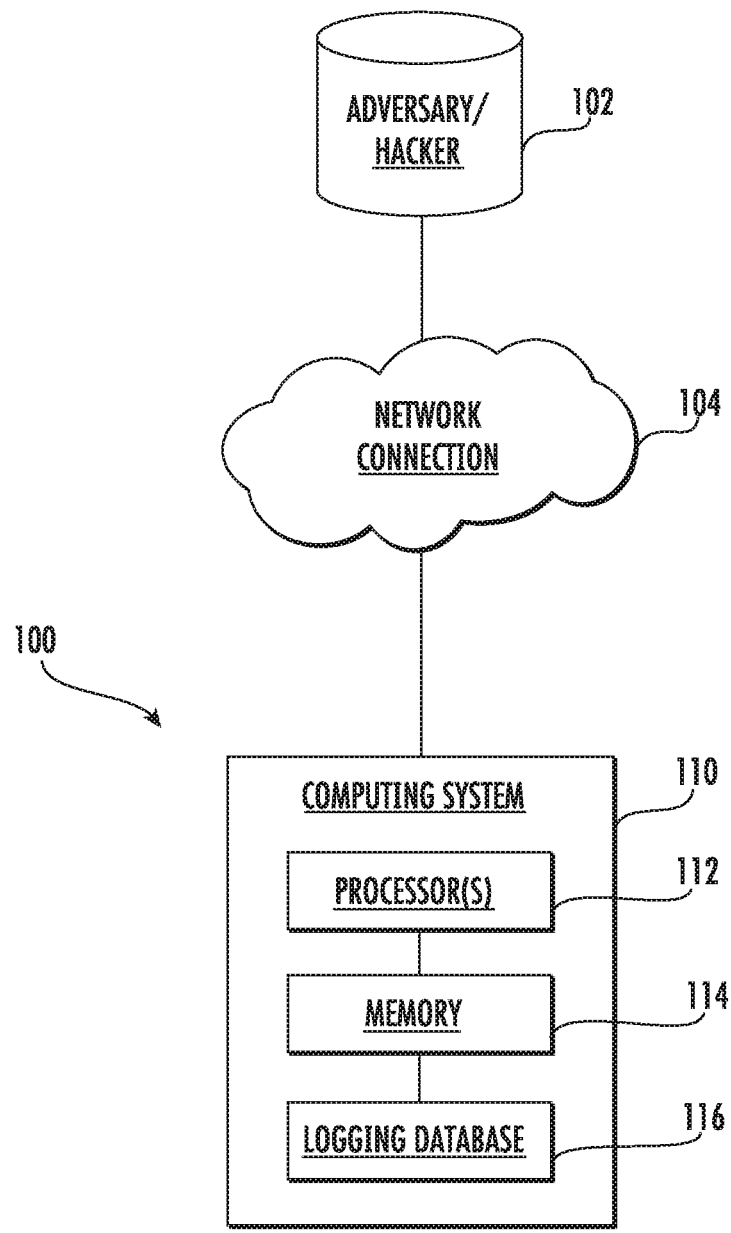
FIG. 1 illustrates a network diagram comprising an adversary in communication with a computing system comprising an example secure logging system of the present disclosure.

As shown in FIG. 1 of the present disclosure, the secure logging system 100 in some embodiments can comprise a computing system 110 comprising one or more processors 112, non-transitory computer readable media/memory 114, and a logging database 116. In some embodiments, the logging database 116 is a database of log messages stored by the computing system 110. In some other embodiments, the logging database 116 is represented by or equivalent to a hash table data structure implemented and maintained by the one or more processors 112. In some embodiments, the one or more processors 112 maintain the logging database 116 both and/or separately as a hash table and a log file stored in the memory of the computing system 110. In some embodiments, hereinbelow, the terms hash table and logging database 116 can be used interchangeably. In some embodiments, the logging database 116 or hash table can be stored in a non-volatile memory or non-volatile random access memory (NVRAM) of the computing system 110 (not shown in this view). In some embodiments, the logging database 116 can be stored in a hard drive, flash storage, or solid state hard drive.

FIG. 1 also illustrates an adversary 102 in communication with the computing system 110 via network connection 104. In some embodiments, the adversary 102 could be another computer system with a malicious intent to corrupt, harm, or destroy the logging database 116 or the computing system 110. In some embodiments, the adversary 102 is a computer virus or other malware sent by another computer with the same intent: to do harm or corrupt the logging database 116 or otherwise harm the computing system 110. In some embodiments, the network connection 104 is an entire network, such as a local area network (LAN), connecting the adversary 102 to the computing system 110 indirectly. In some other embodiments, the adversary 102 and the computing system 110 are directly connected to one another. In further embodiments, especially in the instance where the adversary 102 is a virus or other malware, the adversary 102 is within the computing system 110 and no network connection 104 per se exists between the computing system 110 and the adversary 102.

In some embodiments, the secure logging system 100 is a logging server configured to obtain and maintain a plurality of log messages sent by one or more devices in the network connection 104. In some embodiments, the secure logging system 100 is in electronic communication with one or more devices in the network 104 and is configured to receive and maintain and/or store the log messages generated by the one or more devices in the network 104. In some other embodiments, the secure logging system 100 is a logging system configured to maintain only the logs generated by the secure logging system 100 itself without receiving log messages from other devices in the network 104. In some embodiments, such a secure logging system 100 that maintains logs generated by itself could include a server, a mobile device, a network switch or router, a wireless router, a hub, a personal computer, a tablet PC, a storage area network (SAN) device, or other computer system that generates system log messages and/or stores system log messages for other devices.

Figure 2A:
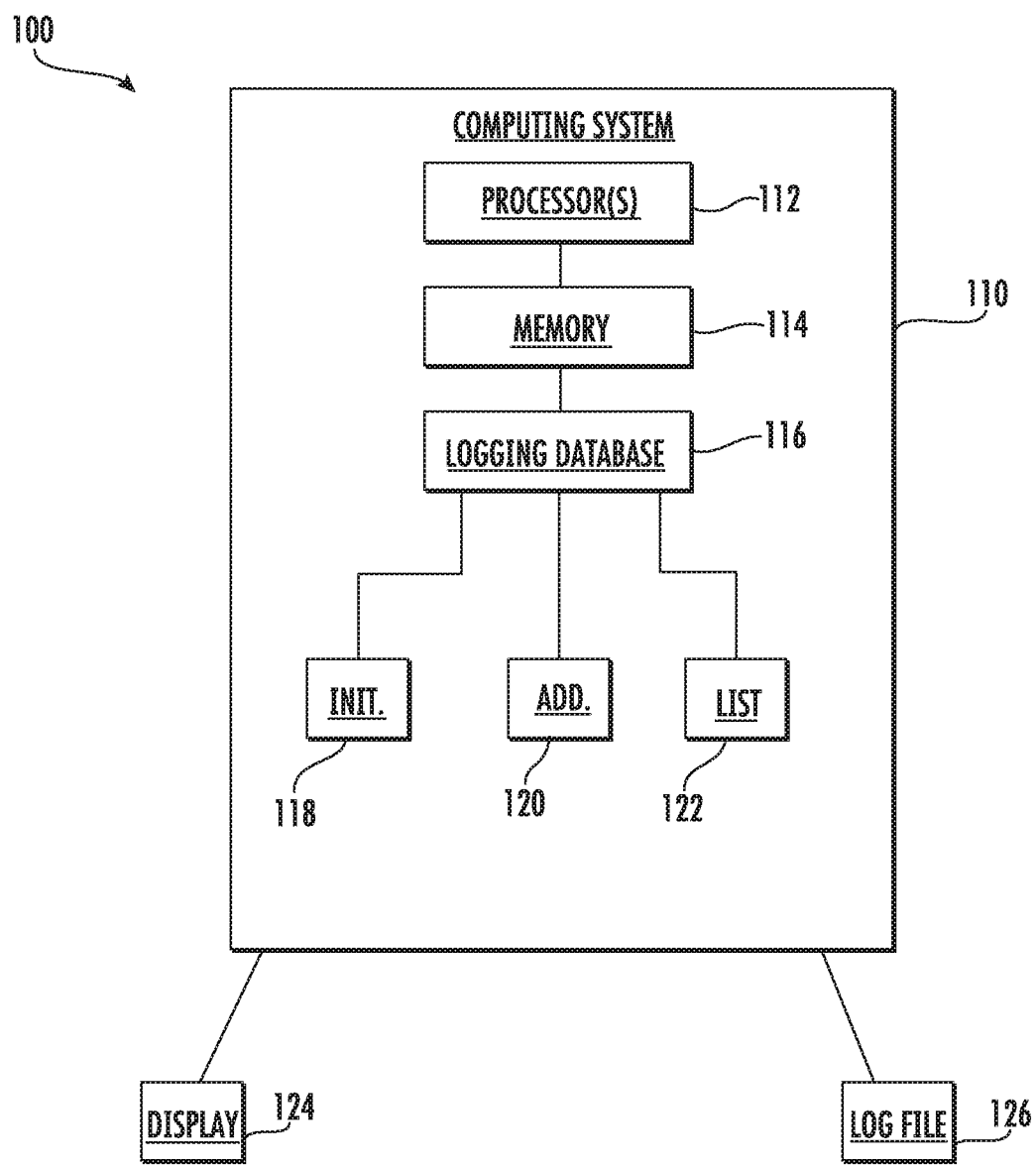
FIG. 2A illustrates a more detailed block diagram of the example secure logging system of the present disclosure which is also in communication with a display window and/or a logging file.

FIG. 2A is a further illustration of the computing device 110. This illustration depicts that, in some embodiments of the present disclosure, the secure logging system comprises, for example and without limitation, at least three major modules implemented by one or more processors 112 of the computing system 110. In some embodiments, the secure logging system 100 comprises an initialization module 118, an addition module 120, and a listing module 122. Each of these modules are implemented by the one or more processors 112 in order to initialize, populate, maintain, and/or recover the logging database 116. In some embodiments, the initialization module 118 is configured to initialize the hash table or logging database 116. In some embodiments, the addition module 120 is configured to populate or add new log messages to the hash table or logging database 116. Moreover, in some embodiments, the listing module 122 is configured to recover and list the entries in the hash table or logging database 116.

Furthermore, the listing module 122 is configured to output the list of the log messages in the hash table or logging database to a display 124 and/or a log file 126 for a crash reconstruction engineer, analyst, or other user to inspect the logs following a crash of the system, corruption of the files, or some other event. In some instances, as described above, an adversary 102 with malicious intent could either cause the logging database 116 to be deleted, corrupted, or could even remove some entries evidencing the adversary's 102 presence in the computing system 110. However, a goal of the present disclosure is to defend against such corruption, elimination, or removal or at least indicate when such a corruption, elimination, or removal by the adversary 102 has occurred so that proper crash reconstruction or root cause analysis can be performed on the computing system 110 or other device for which the computing system 110 is storing log messages.

Figures 2B, 3:
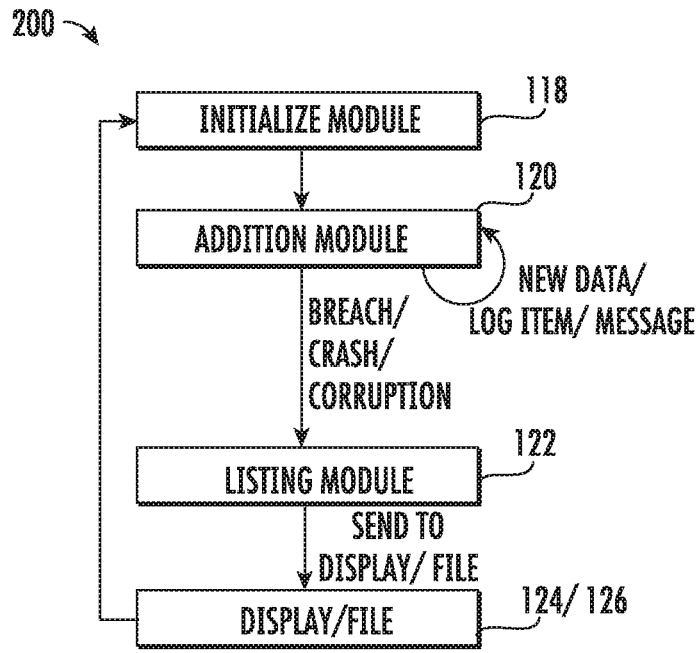
FIG. 2B is an example flow chart illustrating a possible order in which the initialization module, addition module, and listing module operates.
FIG. 3 illustrates a visualization of an example hash table or logging database of the present disclosure.

FIG. 2B illustrates an example flow chart 200 of an example order in which the three modules operate in some embodiments. In some embodiments, the initialization module 118 will operate first to initialize the hash table or logging database 116. The actions that the initialization module 118 are configured to perform are described in further detail hereinbelow. In some embodiments, following initialization by the initialization module 118, the addition module 120 is configured to populate the hash table or logging database 116 or, in other words, add new logging messages received and/or generated by the computing system 110 to the hash table or logging database 116. The actions that the addition module 120 are configured to perform are described in further detail hereinbelow. In some embodiments, until a breach, crash, corruption, and/or some other event occurs, or until the secure logging system 100 is instructed otherwise, the addition module 120 is configured to continue its operations. However, once a breach, crash, corruption, and/or some other event occurs, or once the secure logging system 100 is instructed otherwise, in some embodiments, the listing module 122 is configured to take over. Following the addition module's 120 operations, the listing module 122 is configured to recover and list out the log messages from the hash table or logging database 116 that were not corrupted or otherwise tampered with by the adversary 102 prior to the crash, corruption, or other event that occurred. The listing module 122 is then configured to output the log messages to the display 124 and/or the log file 126. The actions that the listing module 122 is configured to perform are described in further detail hereinbelow.

FIG. 3 depicts an example hash table H (or logging database 116). In this depiction of the hash table H, the first column 302 shows that the hash table H is indexed by i. As will be described in more detail hereinbelow, in some embodiments, the contents of each of the cells of the hash table H comprising entries can be broken down into three portions as shown in the second column 304: a manipulated data item ($xor_i$) with bit length $w+2*\lambda$ bits, followed by an integrity tag $T_i$ with bit-length $\lambda$ bits, followed by a keyID ($ID_i$) with bit-length $\lambda$ bits. In some embodiments, a data item data is a bit representation of a log message. The $xor_i$ portion of the hash table H cells, as described above, are considered to be "manipulated data items" because they are not the data items data themselves, but data items data which have been XORed (described further hereinbelow) with the current contents of the $xor_i$ portion of the cell. In some embodiments, the data items data all have the same length. In some embodiments, if any data item data does not have the same length as the others, the data item data with the wrong length will be electronically "padded" to add length to it such that it is the same length as the other data items data.

Initialization

Figure 4A:
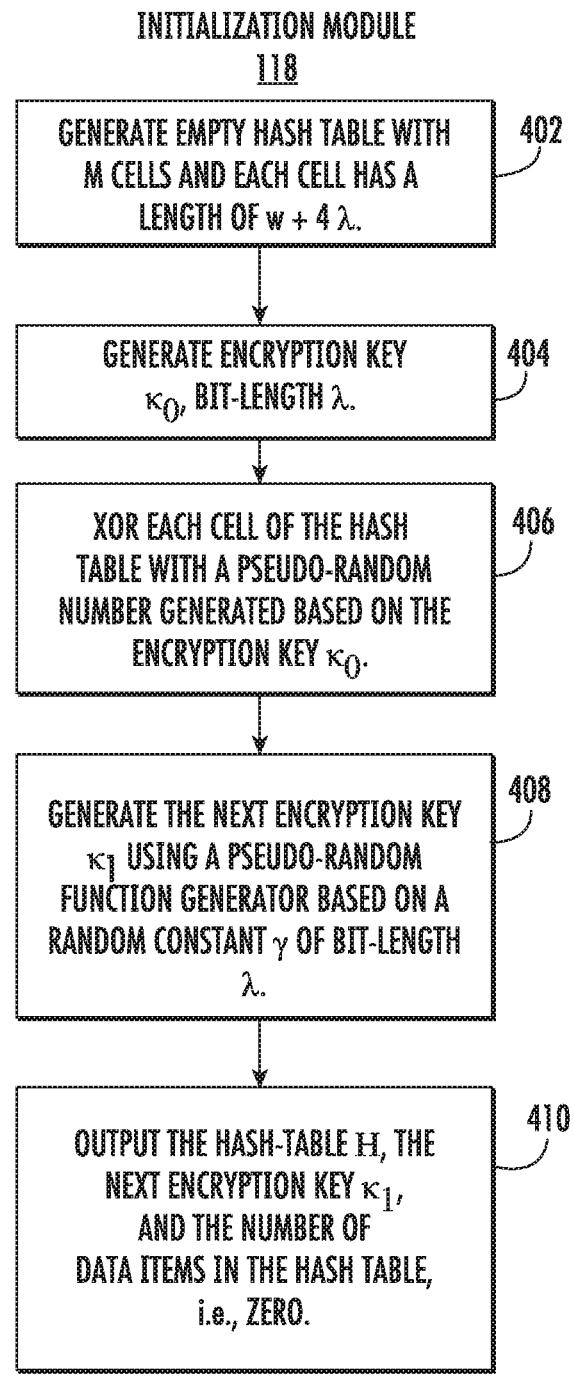
FIG. 4A is an example flow chart illustrating major steps that are taken by the initialization module.

As depicted in FIG. 4A, in some embodiments, the initialization module 118, in a first initialization step 402, is configured to generate an empty hash table H with m number of cells, where m=c*n, c is some selected constant c>1, and n is an upper bound to the number of log messages. The upper bound on the number of log messages n could be based on, in some embodiments, the number of logs expected during a certain period, the number of logs that the memory of the computing system 110 can contain, or even the maximum number of logs that the computing system 110 has ever had to maintain before. In some embodiments, each of the cells of the hash table H has a bit-length of $w+4*\lambda$ bits, where w is the maximum bit-length of the log messages, or data items data, to be stored in the hash table H, and $\lambda$ is a numerical security parameter with a bit-length of 128 bits, 256 bits, or some other multiple of 2 bits.

As described above in FIG. 3, in some embodiments, each of the cells of the hash table H comprising entries can be broken down into three portions: a manipulated data item ($xor_i$) with bit length $w+2*\lambda$ bits, followed by an integrity tag $T_i$ with bit-length $\lambda$ bits, followed by a keyID $ID_i$ with bit-length $\lambda$ bits. In some embodiments, the manipulated data item $xor_i$, integrity tag $T_i$, and keyID $ID_i$ can be stored in each cell in any order. In some embodiments, the manipulated data item ($xor_i$) corresponds to a bit representation of an encrypted log message. Hereinbelow, the data item portion will be referred to as the "xor" portion for clarity. In some embodiments, the keyID corresponds to an ID given to each of the generated random cryptographic keys $\kappa_i$. In some embodiments, the integrity tag T corresponds to a tag indicating whether the cell has been damaged during a crash or other corruption of the cell.

Moreover, in some embodiments, in a second initialization step 404, the initialization module 118 is configured to generate a random cryptographic key $\kappa_0$ that has a bit-length of $\lambda$ bits. In some embodiments, the initialization module 118 is further configured to generate a pseudorandom number based at least partially on the random cryptographic key $\kappa_0$, the pseudorandom number having a bit-length of $w+4*\lambda$ bits. In some embodiments, the pseudorandom number is generated by a pseudorandom number generator. For example and without limitation, the pseudorandom number, or pad=PRG($\kappa_0$).

In some embodiments, the initialization module 118, in a third initialization step 406, is configured to XOR each cell of the empty hash table H with the pseudorandom number pad. Because in some embodiments, the hash table H cells are empty, then each of the cells are filled with zeroes. In some embodiments, the XOR operation is defined by a set of rules, namely: 0 XOR 0=0, 0 XOR 1=1, 1 XOR 0=1, and 1 XOR 1=0. In some embodiments, when a number is XOR'd with a bit string of zeroes, then the result is just the number. Therefore, in some embodiments, the initialization module 118 is simply configured to store the pseudorandom number pad into the cells of the hash table H.

In some embodiments, the initialization module 118, in a fourth initialization step 408, is configured to generate the next random cryptographic key $\kappa_1$. In some embodiments, the next random cryptographic key $\kappa_1$ is equal to a pseudorandom number based on a random constant $\gamma$ of bit-length $\lambda$ bits. For example and without limitation, in some embodiments, $\kappa_1 = PRF\kappa_0(\gamma)$, where PRF is a pseudorandom function family indexed by $\kappa_0$. Finally, in some embodiments, the initialization module 118, in a fifth initialization step 410, outputs the hash table H, the next random cryptographic key $\kappa_1$ and the number of data items in the hash table H for use by the addition module 120 and/or the listing module 122.

Figure 4B:
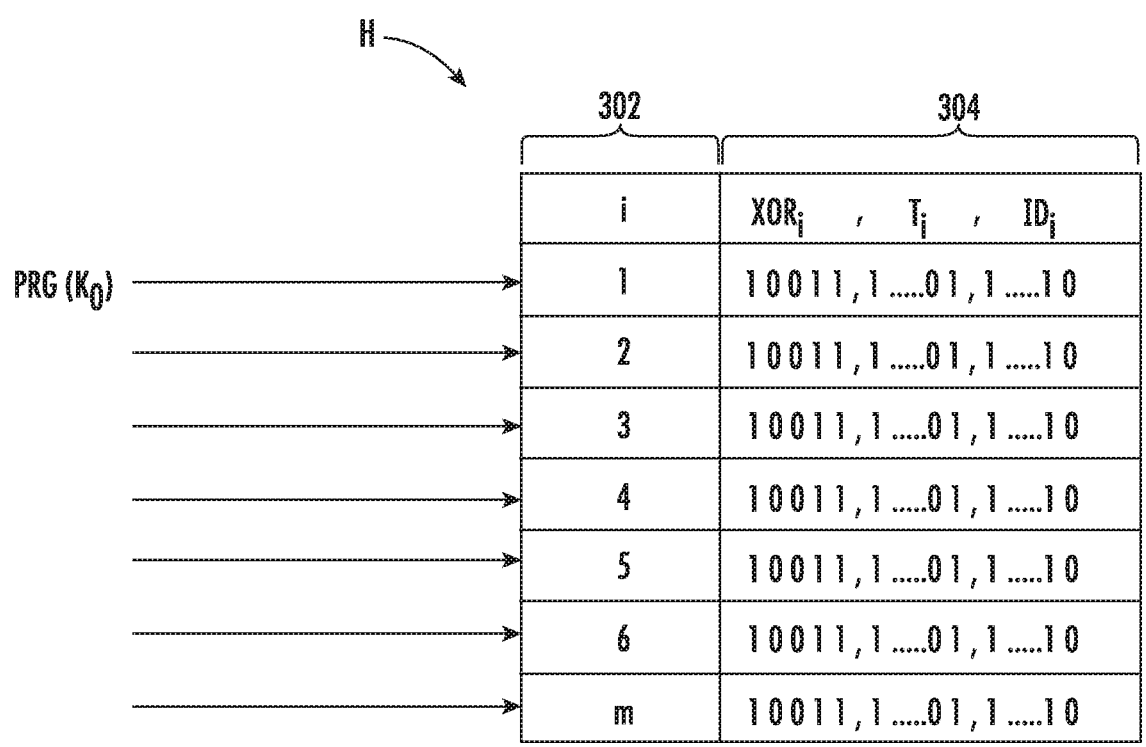
FIG. 4B illustrates a visualization of the example hash table or logging database of the present disclosure after the initialization module has completed its operations.

FIG. 4B illustrates the hash table H after the initialization module 118 has performed its functions and XOR'd all of the cells with the pseudo-random number generated based on the random cryptographic key $\kappa_0$. At the end of the third initialization step 406, each cell of the hash table H (referenced by H[i]) comprises the pseudo-random number which can be broken down into ($xor_i$, $T_i$, $ID_i$). In the example hash table H, the first column 302 represents the index numbers identified by "i" with an "m" maximum number of rows. The second column 304 comprises the entries of the hash table H. In some embodiments, each cell of the hash table H comprises the pseudorandom number based on the random cryptographic key $\kappa_0$. In this figure, the number is broken down by commas to separate the $xor_i$, $T_i$, and $ID_i$ parts for better understanding. In some embodiments, the cells will be filled with bit strings of 1's and 0's without any commas (the commas are depicted in FIG. 4B for example and clarity). Furthermore, in the embodiment shown in FIG. 4B, the numbers are not long. They are only a few bits long for example purposes. Each section of the cell ($xor_i$, $T_i$, and $ID_i$) will, in some embodiments, have the same dimensions (bit-length) as described above. Furthermore, in this example embodiment, the numbers have ellipses (" . . . ") to indicate that the number continues but is not shown. This is to indicate that the number is longer than shown.

The following pseudocode includes example pseudocode that can, in some embodiments, be used to implement or describe the initialization module 118 further. In the example pseudocode below, DS is equivalent to the hash table H's state. In other words, DS is a bit string that includes all of the entries from the cells of the hash table H. Furthermore, DS includes the current iteration of the random cryptographic key $\kappa_i$.

```
// Let c > 1, k > 2 be constant system parameters, and γ ←$ {0,1}^λ is a random //
constant
1              m = c * n;
// Generate hash table of m cells, each of size (bit-length) w + 4 * λ bits:
// w
+ 2 * λ bits for an encrypted data item (including Enc's random coins and //
integrity tags), λ bits each for cell integrity tag T_j and keyID ID_j
2              H_0 = EmptyHashTable(m, w + 4 * λ);
3              κ_0 ←$ {0,1}^λ;
// Generate m * (w + 4 * λ) bit pseudo-random pad
4              pad = PRG(κ_0);
5              H_1 = H_0 ⊕ pad;
6              κ_1 = PRFκ_0(γ); DS_1 = (H_1, κ_1);
7              output (DS_1, κ_0);
```

Addition

Figure 5A:
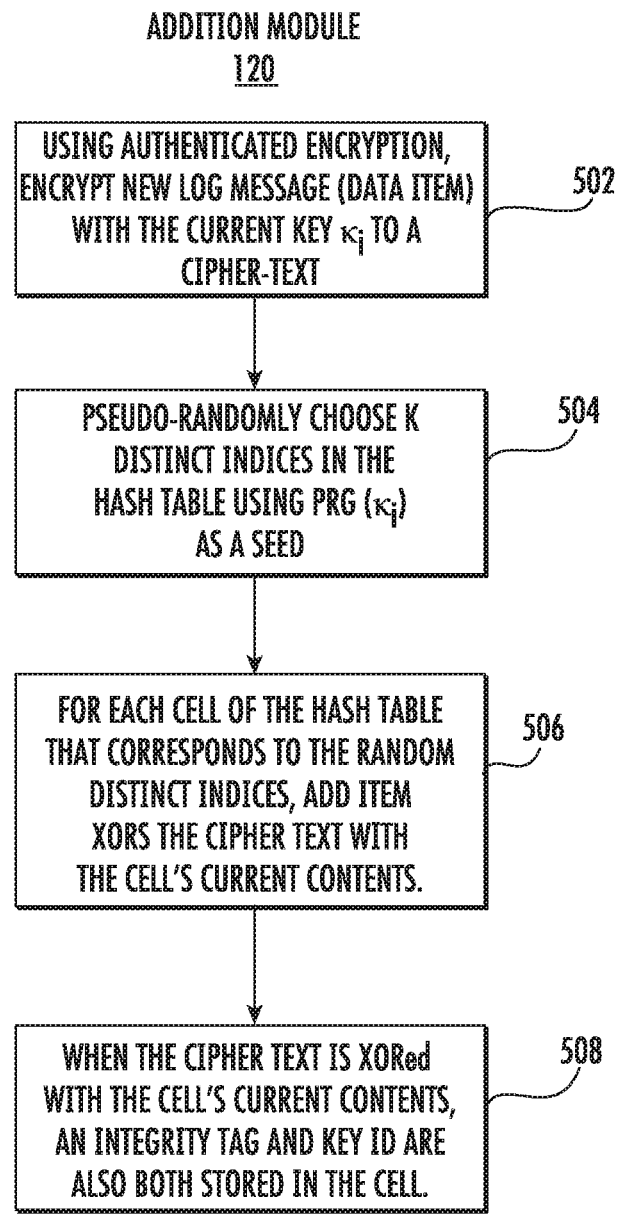
FIG. 5A is an example flow chart illustrating major steps that are taken by the addition module.

Next, FIG. 5A depicts an example addition module 120 flow chart depicting several major steps taken by the addition module 120 during its operation. In some embodiments, once the hash table H has been initialized by the initialization module 118, as new log entries are received by the secure logging system 100 to be stored into the logging database 116, the addition module 120 is configured to receive as input and then add these new logging messages (called data items data) to the database 116 or the hash table H. In some embodiments, the addition module 120 is triggered without an initialization. In order to add the new logging messages or data items data, in some embodiments, the addition module 120 is configured, in a first addition step 502, to use authenticated encryption to encrypt the new data item data using the current random cryptographic key $\kappa_i$, where "i" is the number of data items currently stored in the hash table H. In some embodiments, the authenticated encryption of the new data item results in a ciphertext $c_i$ which has a same bit-length as $xor_i$ or $w+2*\lambda$ bits. In some embodiments, the addition module 120 is configured to use encryption methods that encrypt-then-MAC. For example and without limitation, in some embodiments, the addition module 120 is configured to utilize AES-CTR with HMAC as an encryption algorithm.

In some embodiments, the addition module 120, in a second addition step 504, is configured to pseudo-randomly choose k distinct indices in the hash table H, using $\kappa_i$ as a seed for pseudo-randomly choosing the $I_j$ distinct indices.

In some embodiments, k is a random constant whole number greater than or equal to 1. In some embodiments, k is a random constant whole number greater than or equal to 2. In some embodiments, k is a random constant whole number greater than or equal to 3. In some embodiments, in a third addition step 506, for each cell of the hash table H indexed by the k distinct indices $I_j$, i.e. $H[I_j]$, the addition module 120 is configured to XOR the cipher text a to $H[I_j]$'s current contents. For example without limitation, in some embodiments, the addition module 120 is configured to XOR the new cipher text $c_i$ into k=3 pseudo-randomly selected cells. In some embodiments of this example, the addition module 120 does this by XOR'ing the contents of $xor_{ij}$ in each of the three pseudorandom cells with the cipher text $c_i$.

In some embodiments, in a fourth addition step 508, the addition module 120 is configured to compute an HMACκ_i over the XOR'd portion of each of the cells $H[I_j]$ that had the cipher text $c_i$ XOR'd to them. In some embodiments, the addition module 120 is further configured to store the HMACκ_i calculation into the integrity tag $T_{ij}$ portion of the respective cells. In some embodiments, $T_{ij}$=HMACκ_i($xor_{ij}$). In some embodiments, HMAC is a keyed-hash message authentication code or a hash-based message authentication code. In some embodiments, the HMAC is a specific type of message authentication code (MAC) involving a cryptographic hash function and a secret cryptographic key. It may be used to simultaneously verify both the data integrity and the authentication of a message. Those of ordinary skill in the art will appreciate the HMAC's usage in this system.

In some embodiments, during the fourth addition step 508, the addition module 120 is further configured to store a keyID $ID_{ij}$ into the k pseudo-randomly selected cells. Using the non-limiting example above, where k=3, the keyID is stored into the keyID $ID_{ij}$ portion of the three pseudorandom cells. In some embodiments, the keyID $ID_{ij}$ is a pseudo-random number generated by a pseudo-random function using $\kappa_i$ and j as seeds. For example and without limitation, in some embodiments, $ID_{ij}$=PRFκ_i($\kappa_i$, j) Once the keyID $ID_{ij}$ is generated, the addition module 120 is configured to store it into the $ID_{ij}$ portion of each of the respective three pseudo-randomly selected cells.

Next, in some embodiments, the addition module 120 is configured to calculate the next cryptographic key, $\kappa_{i+1}$, using a pseudo-random function based on the random constant γ. As described above, in some embodiments, γ is a random constant of bit-length λ bits. For example and without limitation, in some embodiments the next cryptographic key $\kappa_{i+1}$=PRFκ_i(γ). Then, in some embodiments, the addition module 120 is configured in some embodiments, to output the updated hash table H and the next cryptographic key $\kappa_{i+1}$, so that either a new data item/logging item/logging message can be added to the hash table H by the addition module 120, or the listing module 122 can perform its functions. Finally, in some embodiments, the addition module 120 is configured to output the updated hash table H and the new key $\kappa_{i+1}$. Thus, replacing $\kappa_i$ with $\kappa_{i+1}$ allows forward-confidentiality and forward-integrity as described hereinabove. If the adversary 102 compromises after a certain number of data items data have been added, it will learn $\kappa_i$ with i>n. Thus, the adversary 102 cannot modify anything that was encrypted with a key $\kappa_i$ for i≤n. Similarly, indices previously generated by PRG are indistinguishable from random bit strings for the adversary 102.

Figure 5B:
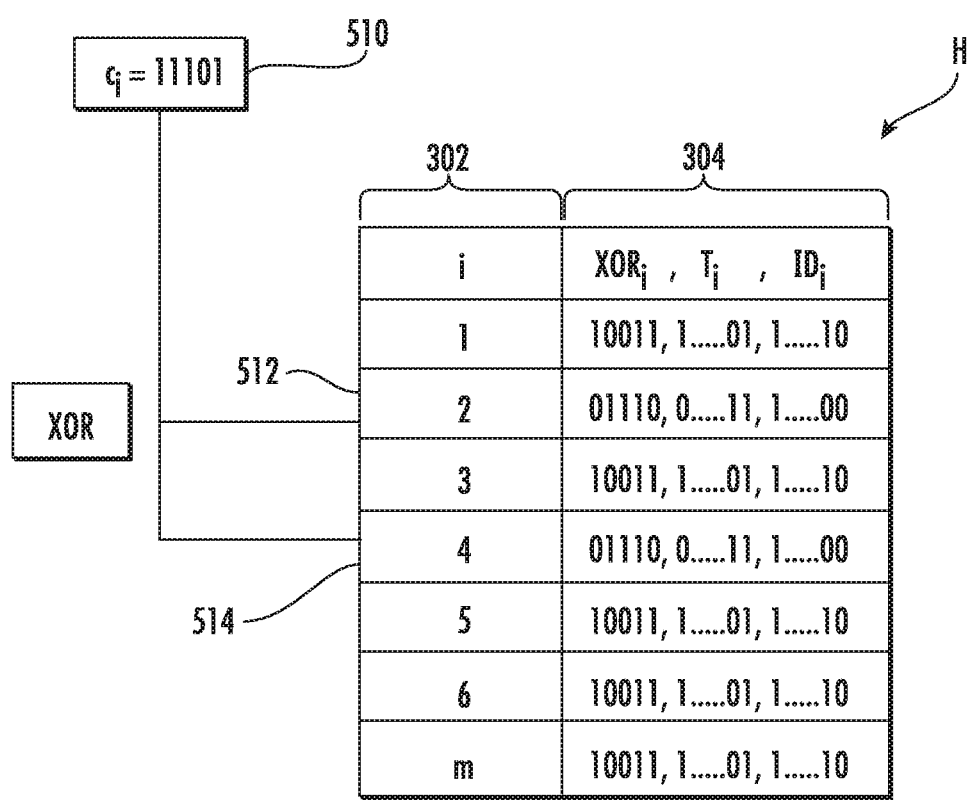
FIG. 5B illustrates a visualization of the example hash table or logging database of the present disclosure after the addition module has completed its operations for one data item or log message.

As shown in the example embodiment in FIG. 5B, the hash table H is populated with m entries. This example hash table H demonstrates what occurs, in some example embodiments, to the contents of the cells from the example initialized hash table H from FIG. 4B after a new data item/logging message is added to the hash table H. As described above, the addition module 120 has generated the cipher text a 510 and has calculated k=2 pseudorandom cells to XOR the cipher text $c_i$ 510 to: cell i=2 512 and cell i=4 514. As shown in FIG. 4B, prior to the XOR operation, each of the $xor_i$ sections of the cells of the hash table H were initialized with the bits "10011". During the XOR operations, the hash table cells H[2] and H[4] have been XOR'd with the cipher text $c_i$ 510. As described above, when the bits "10011" are XOR'd with the bits "11101," the result is the bits "01110." Therefore, the hash table cells H[2] and H[4] have been updated in the $xor_i$ portion to be "01110," indicating that a new data item/log message has been added to the hash table H. As described hereinabove, the $xor_i$ portion is much larger than the 5 bits represented in FIG. 5B. These numbers are instead just for example purposes only to demonstrate how the module operates. Additionally, the integrity tag $T_i$ and keyID $ID_i$ portions have been calculated and updated as described hereinabove. Like the $xor_i$ portion, the integrity tag $T_i$ and keyID $ID_i$ portions are most likely much larger in actual operation, but these numbers are for example purposes only.

The following pseudocode includes example pseudocode that can, in some embodiments, be used to implement or describe the addition module 120 further. In the example pseudocode below, DS is equivalent to the hash table H's state. In other words, DS is a bit string that includes all of the entries from the cells of the hash table H. Furthermore, the operator ⊕ is equivalent to the XOR operation described herein.

```
// Parse DS_i as (H_i, κ_i)
1            c_i ← Enc_κi (data_i);
// Generate k Distinct Random Numbers (DRN) between 1 and m = c * n
2            {I_1, ..., I_k} ← DRN(PRG(κ_i));
// Compute H_i + 1 out of H_i
3            H_i + 1 = H_i;
4            foreach I_j do
// Parse H_i + 1[I_j] as (xor_ij, T_ij, ID_ij)
5                xor_ij = xor_ij ⊕ c_i;
6                T_ij = HMAC_κi(xor_ij);
7                ID_ij = PRF_κi(κ_i, j);
8            end
9            κ_i + 1 = PRF_κi(γ);
10           output DS_i + 1 = (H_i + 1, κ_i + 1)
```

Listing

In some embodiments, once the addition module 120 has finished adding all of the logging messages that need to be added to the hash table H, the listing module 122 is configured to take over and perform its functions as described hereinbelow. In some embodiments, the listing module 122 is configured to automatically operate based on some triggering event or some other event experienced by the secure logging system 100. In some embodiments, the listing module 122 is configured to begin operations after a length of time set in a timer of the secure logging system 100. In some embodiments, the listing module 122 is configured to begin operations following a crash or other major event experienced by the secure logging system 100. In some embodiments, the listing module 122 is configured such that it will not begin operating until after a crash, breach, security event, etc. In some embodiments, the listing module 122 is configured to begin operations after an adversary 102 has been detected by the secure logging system 100. In some embodiments, the listing module 122 is configured to begin operations after some other kind of security breach has been detected by the secured logging system 100. In some embodiments, the listing module 122 is configured to perform its operations following some other trigger, such as a command from a user, device, etc.

Figure 6A:
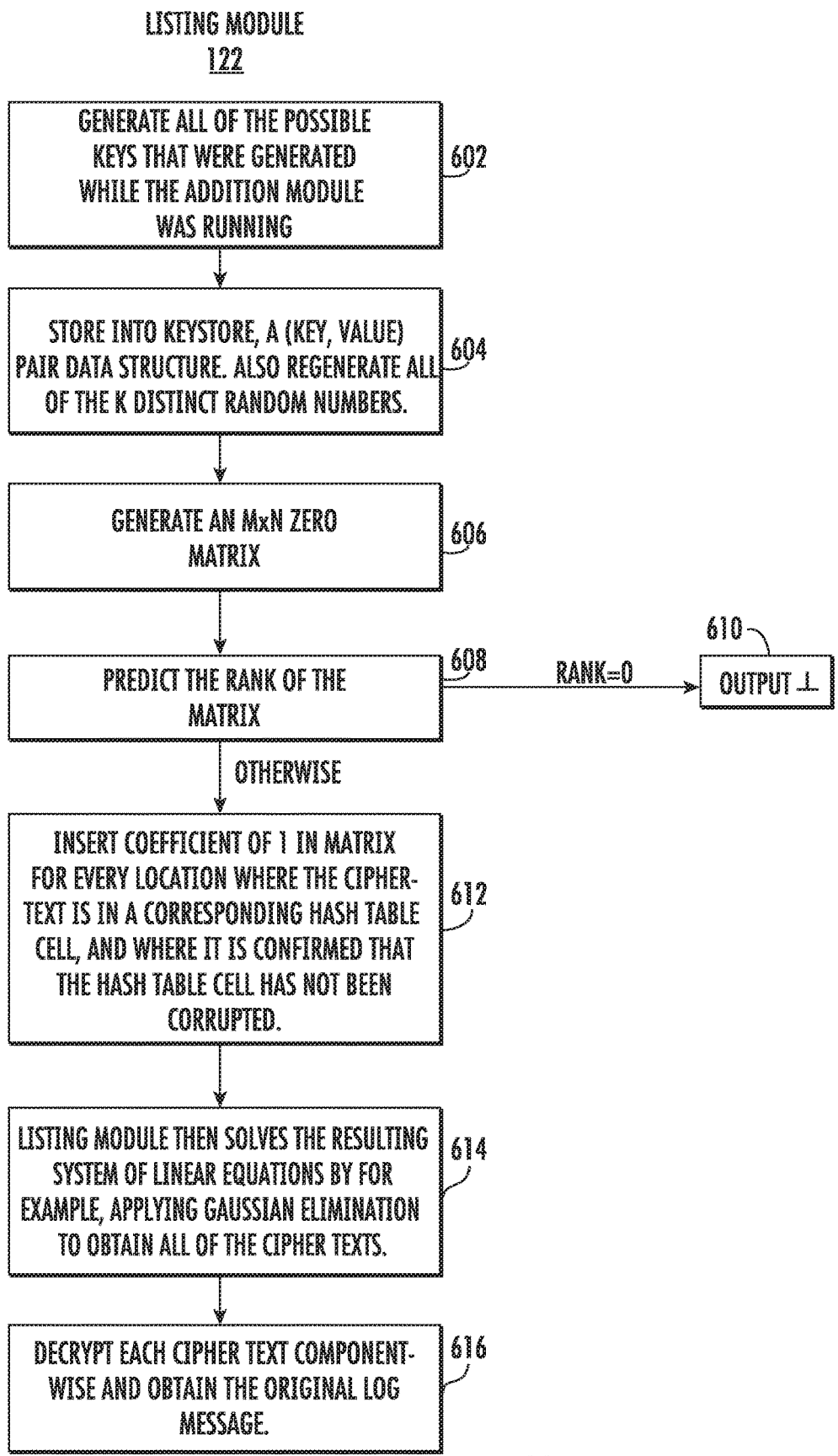
FIG. 6A is an example flow chart illustrating major steps that are taken by the listing module.

FIG. 6A illustrates an example flow chart depicting steps implemented by the listing module. In some embodiments, the listing module 122 is configured to recover and list all of the data items from the logging database 116 or hash table H following some event, for example without limitation, one or more of the possible events described above. Initially, the listing module 122 is configured to receive the initial random cryptographic key $\kappa_0$ as a parameter. Because the listing module 122 is configured to receive the initial random cryptographic key $\kappa_0$ as a parameter, the listing module 122 is able to derive all other cryptographic keys $\kappa_i$ that were generated by the addition module 120. In addition, the listing module 122 is able to replay all the random coins which the pseudorandom number generator, PRG, produced during the addition module 120. Thus, the listing module 122 is configured in some embodiments, such that it is about to determine all of the indices of where in the hash table H (which cells) each data item $data_i$ was XORed.

In some embodiments, in a first listing step 602, the listing module 122 is configured to recompute all of the n possible cryptographic keys $\kappa_i$, where n is the upper bound to the number of log messages or data items data. For example without limitation, in some embodiments $\kappa_i = PRF\kappa_{i-1}(\gamma)$, where i is incremented by 1 from 1 to n. In some embodiments, the listing module 122 is configured to link each of the cryptographic keys $\kappa_i$ with their k corresponding keyID's ID. In some embodiments, in order to perform this link, the listing module 122 is configured to use a simple (key, value) store, for example without limitation, a KeyStore. For example without limitation, in a second listing step 604, for all of the k possible locations or indexes $I_j$ where $\kappa_i$ could have been used to compute $T_{ij}$ (remember, $T_{ij}$=HMAC$\kappa_i$ ($xor_{ij}$)), the listing module 122 is configured to store tuple ($\kappa_i$, i, $I_j$) with its corresponding keyID ID in the KeyStore. For example without limitation, for j=1 to k, ID=PRF$\kappa_i(\kappa_i$, j) and KeyStore.put(ID, ($\kappa_i$, i, $I_j$)). Those of ordinary skill in the art will appreciate that a key store is a repository (i.e., file, hardware device, etc.) used to store cryptographic keys. Here, in some embodiments, the cryptographic key is stored in the key store as well as the keyID and other parameters.

Next, in some embodiments of a third listing step 606, the listing module 122 is configured to generate an m×n zero matrix M of coefficients over Galois Field GF(2). GF(2) is chosen or selected in some embodiments because XORing (the operation used in the addition module 120) equals addition in finite fields of characteristic 2. In some embodiments, the listing module 122 is configured to generate a system of linear equations $M \cdot \vec{x} = H$, where M is the m×n matrix over GF(2) and the hash table H can be parsed as a length m vector over $GF(2^{w+O(\lambda)})$. In some embodiments, each cell of the hash table H represents one component of the vector. In some embodiments, the listing module 122 is configured to use the m×n matrix M of coefficients as the left-hand side of the system of linear equations. In some embodiments, the listing module 122 is configured to fill the matrix M with ones based on the locations of the cells where the data items data were added (XORed) and zeros where there were not data items added (XORed). In some embodiments, these are the coefficients to be used to solve the system of linear equations. In some embodiments, the listing module 122 is configured to use the hash table H as the right-hand side of the system of linear equations.

Following this, in some embodiments, in a fourth listing step 608 the listing module 122 is configured to guess the number of log entries or data items data which have been added to the hash table H. This is also known as determining the rank of the matrix M. If the rank of the matrix M is zero, meaning no entries are in the hash table H, then the listing module 122, in some embodiments, is configured to output, in a fifth listing step 610, a symbol ⊥ indicating a failure has occurred. In some embodiments, the listing module 122 is configured to output the failure symbol to the display 124 and/or a log file 126 indicating that there was a breach, crash, corruption, or some other event that occurred such that the hash table H or logging database 116 was deleted or corrupted.

In some embodiments, when the rank is non-zero, the listing module 122 is configured to replay all the indices $I_j$ for the data items $data_i$ by using the keys Ki. In some embodiments, for each position/index $I_j$ in the hash table H, the listing module 122, in a sixth listing step 612, is configured to insert a coefficient of 1 in column i, row $I_j$ of the matrix M. However, in some embodiments, the listing module 122 is configured such that it only inserts a coefficient of 1 in the matrix M cell if the corresponding integrity tag $T_{ij}$ matches the $HMAC\kappa(xor_{ij})$ of the corresponding $xor_{ij}$ portion of the hash table H cell $H[I_j]$. In order to verify that the integrity tag $T_i$ matches, in some embodiments, the listing module 122 is configured to fetch the corresponding key from KeyStore using the keyID $ID_i$. Furthermore, in some embodiments, the listing module 122 is configured to verify whether the contents of H[I] is supposed to be in that position/index I. In some embodiments, if one of the checks described above fails, the listing module 122 is configured to keep the coefficient in the matrix M at $M[I_j, i]$ at 0 and the $xor_{ij}$ portion of the hash table H cell at $H[I_j]$ is set to $0^{w+2*\lambda}$ (or a number 0, with w+2*λ zeros; i.e., for example without limitation, if w+2*λ=5, the $xor_{ij}$ portion of the hash table H cell at $H[I_j]$ would be filled with "00000"). In some embodiments, for example without limitation, if a matrix M entry $M[I_j, i]=1$, then the matrix entry is a part of the system of linear equations, whereas if the matrix M entry $M[I_j, i]=0$, then the entry is not a part of the system of linear equations.

In some embodiments, in order to remove the initial randomness from all of the $xor_i$ portions of the hash table H, the listing module 122 is configured to recompute the pseudorandom bit-string, or pad, and then XOR pad to all of the remaining non-zero cells in the hash table H. In some embodiments, the resulting hash table H can then be represented as a vector $\vec{v}$ with a dimension m.

Next, in some embodiments, the listing module 122, in a seventh listing step 614, is configured to solve the resulting system of linear equations $M \cdot \vec{c} = \vec{v}$ for $\vec{c}$. In some embodiments, the listing module 122 is configured to use, for example without limitation, Gaussian elimination to solve the resulting system of linear equations. In some embodiments, the listing module 122 is configured to use, for example without limitation, a substitution method to solve the resulting system of linear equations. Once the system of linear equations are solved for $\vec{c}$, this vector, in some embodiments is a vector comprising all of the cipher texts $c_i$ that were XORed in the hash table H in the addition module 120.

Finally, in some embodiments, the listing module 122, in an eighth listing step 616, is configured to decrypt, component-wise, each of the components of the vector $\vec{c}$ thus, obtaining a list of all of the data items data/log messages XORed into the logging database 116 or hash table H by the addition module 120. In some embodiments, the listing module 122 is configured to use encryption and decryption methods that encrypt-then-MAC. For example and without limitation, in some embodiments, the listing module 122 is configured to utilize AES-CTR with HMAC as a decryption algorithm.

In some embodiments, the listing module 122 is configured to determine if the Gaussian elimination (or other method used to solve the system of linear equations) finds an overdetermined system of linear equations. If so, in some embodiments, the listing module 122 is configured to output the symbol ⊥ indicating a failure occurred. In some embodiments, the listing module 122 is configured to output this failure symbol to the display 124 and/or a log file 126 indicating that there was a breach by the adversary 102, a crash, corruption, or some other event that occurred. Otherwise, in some embodiments, the listing module 122 is configured to output the data items ($data_1$, $data_{rank}$) to the display 124 and/or the log file 126. As described hereinabove, these data items data, in some embodiments, will be used by analysts, network engineers, crash reconstruction engineers and others to reconstruct crashes and otherwise diagnose system issues caused by the adversary 102 and/or non-adversary related crashes and corruptions. In some embodiments, the listing module 122 is configured to output the data items ($data_1$, . . . , $data_{rank}$) in the order they were received.

The following pseudocode includes example pseudocode that can, in some embodiments, be used to implement or describe the listing module 122 further.

```
// Parse DS as (H, κ_n) and H[i] as (xor_i, T_i, ID_i), 1 ≤ I ≤ m
// Let KeyStore be a (key, value)-pair data structure.
// Generate all possible keys and ID_s, store in KeyStore.
1  for I = 1 to n do
2    κ_i = PRFκ_{i-1}(γ);
// Re-Generate k Distinct Random Numbers (DRN)
3    {I_1, ..., I_k} ← DRN(PRG(κ_i));
4    for j = 1 to k do
5      ID = PRFκ_i(κ_i, j);
6      KeyStore.put(ID, (κ_i, i, I_j));
7    end
8  end
9  M = m x n zero matrix over GF(2);
//Predict M's rank rank
10 rank = 0;
11 for i = 1 to m do
12   (κ_j, j, I_j) = KeyStore.get(ID_i);
13   rank = max(rank, j);
14 end
15 if rank = 0 then output ⊥; end
16 for i = 1 to rank do
```

-continued

```
17    {I_1, ..., I_k} ← DRN(PRG(κ_j));
18    for j = 1 to k do
19      (κ_t, t, I) = KeyStore.get(ID_{Ij});
// Has the adversary corrupted the cell? If not put a 1 in the corresponding //
matrix entry. Otherwise, put a 0.
20      if I = I_j and HMACκ_t(xor_{Ij}) = T_{Ij} then M[I_j, i] = 1; else
           xor_{Ij} = 0^{w + 2 * λ}; end
21    end
22  end
// Re-generate m *(w + 4 * λ) bit pseudo-random pad
23  pad = PRG (κ_0);
// Let pad[ i ] denote the w + 2 * λ bit string covering xor_i in H[ i ]
24  for i = 1 to m do
25    if xor_i ≠ 0^{w + 2 * λ} then xor_i = xor_i ⊕ pad[ i ]; end
26  end
// Let vector v = (xor_1, ..., xor_m) ∈ GF(2^{(w + 2 * λ) ^ m})
// Let vector c be a solution vector over (GF(2^{w + 2 * λ}))^n
27  Solve M · c = v for c;
// Let c_1, ..., c_{rank} be the unique solutions
28  for i = 1 to rank do
29    data_i = Decκ_i(c[ i ]); //Decryption might fail due to corruption, etc.
30    if data_i = ⊥ then output ⊥; end
31  end
32  output (data_1, ..., data_{rank});
```

In some embodiments, once the listing module 122 has output the data items ($data_1$, . . . , $data_{rank}$), the secure logging system is configured to begin operating the initialization module 118 again. From there, the process as disclosed herein above starts over again.

FIG. 6B illustrates an example augmented matrix AM that could be generated by the listing module 122 to help solve the system of linear equations as described above. As shown in the figure, the left-hand side of the system of linear equations includes the m×n matrix M that includes the coefficients (0 or 1) that indicates in which hash table H cell the cipher text $c_i$ is stored. For example, in the first column of the matrix M, $c_1$ has a coefficient of 1 in two places. This indicates that the cipher text $c_1$ has been XORed into two hash table H cells and the hash table H cells where $c_1$ is stored in is indicated on the right-hand side of the augmented matrix AM under the column $H_n$. As described hereinabove, if the adversary 102 introduces inconsistencies in the augmented matrix AM, the listing module 122 is configured such that it knows that the inconsistencies cannot be the result of a crash and the listing module 122 is configured to output the failure symbol ⊥ to the display 124 and/or a log file 126.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

The subject matter disclosed herein can be implemented in software in combination with hardware and/or firmware. For example, the subject matter described herein can be implemented in software executed by a processor or processing unit. In one implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A secure logging system in electronic communication with a display or a log file, the secure logging system comprising:
    one or more computing systems comprising one or more processors and non-transitory computer readable media;
    a logging database comprising one or more cells;
    an initialization module, implemented by the one or more processors, the initialization module configured to initialize each cell of the logging database with a pseudo-random number based at least in part on a first random cryptographic key generated by the initialization module;
    an addition module, implemented by the one or more processors, the addition module configured to add one or more encrypted data items to one or more of the one or more cells of the logging database, wherein the one or more encrypted data items are encrypted using an indexed random cryptographic key before being added; and
    a listing module, implemented by the one or more processors, the listing module configured to decrypt the one or more encrypted data items using the indexed random cryptographic key and transmit unencrypted versions of the one or more encrypted data items from the logging database to the display or the log file for user inspection following a crash by the secure logging system or a breach of the secure logging system by an adversary system;
    wherein the logging database comprises m cells, wherein m=c*n, c is a constant greater than one, and n is a given maximum number of data items added into the logging database during a full operation of the addition module; and
    wherein each cell of the logging database has a bit-length of w+4*λ bits, where w is a maximum bit-length of one or more data items that can be stored in the logging database, and λ is a numerical security parameter.

2. The secure logging system of claim 1, wherein the numerical security parameter is a multiple of two.

3. The secure logging system of claim 1, wherein each cell of the logging database comprises space for an authenticated encrypted data item with bit-length w+2*λ, an integrity tag T with bit-length λ, and a key ID with bit-length λ; and wherein the key ID is a pseudo-random family (PRF) function output.

4. The secure logging system of claim 1, wherein the initialization module is further configured to fill each cell of the logging database with a pseudo random number equal to an output of a pseudo-random number generator, the output being based at least in part on the random cryptographic key; and
wherein the initialization module is further configured to:
generate and output a new indexed random cryptographic key based on a pseudo-random function output of a random constant to the addition module;
output a number of data items currently in the logging database to the addition module; and
output all entries in the logging database to the addition module.

5. The secure logging system of claim 4, wherein the addition module is further configured to:
use authenticated encryption to encrypt a new data item according to the new indexed random cryptographic key to a ciphertext;
XOR at least a portion of each of a plurality of cells of the one or more cells of the logging database with the ciphertext to obtain a plurality of corresponding results; and
store each of the plurality of corresponding results in their respective cells of the plurality of cells.

6. The secure logging system of claim 5, wherein the XOR operation is defined by a set of rules comprising: 0 XOR 0=0, 0 XOR 1=1, 1 XOR 0=1, and 1 XOR 1=0.

7. The secure logging system of claim 5, wherein the plurality of cells are chosen in a pseudo-random fashion;
wherein a corresponding key ID, at least partially based on the new indexed random cryptographic key, is also stored in each of the plurality of cells with the corresponding result; and
wherein the corresponding key ID can be used to determine a corresponding indexed random cryptographic key that is associated with a corresponding one of the one or more cells of the logging database.

8. The secure logging system of claim 1, wherein the listing module is further configured to:
decrypt one or more data items, that was encrypted and XORed into the logging database, based on at least the first random cryptographic key;
determine if the one or more data items has been corrupted; and
list all of the one or more data items, that have been decrypted and that have not been corrupted, for transmission to the display or the log file.

9. The secure logging system of claim 8, wherein the listing module is further configured to verify when the one or more data items at a given cell is supposed to be stored in the given cell by comparing an expected integrity tag T with an integrity tag stored in the given cell.

10. A method for securely storing and recovering log messages for computing systems, the method comprising:
providing one or more computing systems, each of the one or more computing systems comprising one or more processors and non-transitory computer readable media;
providing at least one computing system of the one or more computing systems with a logging database comprising one or more cells;
implementing an initialization module, implemented by the one or more processors of the at least one computing system, the initialization module configured to initialize each cell of the logging database with a pseudo-random number based at least in part on a first random cryptographic key generated by the initialization module;
receiving or generating one or more data items at the at least one computing system;
implementing an addition module, implemented by the one or more processors of the at least one computing system, the addition module configured to add one or more encrypted data items to one or more of the one or more cells of the logging database, wherein the one or more encrypted data items are encrypted by using an indexed random cryptographic key before being added;
implementing a listing module, implemented by the one or more processors of the at least one computing system, the listing module configured to decrypt and list the one or more encrypted data items using the indexed random cryptographic key; and
transmitting unencrypted versions of the one or more encrypted data items from the logging database to a display or a log file in electronic communication with the at least one computing system for user inspection following a crash by the at least one computing system or a breach of the at least one computing system by an adversary system;
wherein the logging database comprises m cells, wherein m=c−n, c is a constant greater than one, and n is a given maximum number of data items added into the logging database during a full operation of the addition module; and
wherein each cell of the logging database has a bit-length of $w+4*\lambda$ bits, where w is a maximum bit-length of one or more data items that can be stored in the logging database, and $\lambda$ is a numerical security parameter.

11. The secure logging system of claim 10, wherein the numerical security parameter is a multiple of two.

12. The secure logging system of claim 10, wherein each cell of the logging database comprises space for an authenticated encrypted data item with bit-length $w+2*\lambda$, an integrity tag T with bit-length $\lambda$, and a key ID with bit-length $\lambda$; and
wherein the key ID is a pseudo-random family (PRF) function output.

13. The method of claim 10, wherein the initialization module is further configured to fill each cell of the logging database with a pseudo random number equal to an output of a pseudo-random number generator, the output being based at least in part on the random cryptographic key, and
wherein the initialization module is further configured to:
generate and output a new indexed random cryptographic key based on a pseudo-random function output of a random constant to the addition module;
output a number of data items currently in the logging database to the addition module; and
output all entries in the logging database to the addition module.

14. The method of claim 13, wherein the addition module is further configured to:
use authenticated encryption to encrypt a new data item according to the new indexed random cryptographic key to a ciphertext;
XOR at least a portion of each of a plurality of cells of the one or more cells of the logging database with the ciphertext to obtain a plurality of corresponding results; and
store each of the plurality of corresponding results in their respective cells of the plurality of cells.

15. The method of claim 14, wherein XOR is defined by a set of rules comprising: 0 XOR 0=0, 0 XOR 1=1, 1 XOR 0=1, and 1 XOR 1=0.

16. The method of claim 14, wherein the plurality of cells are chosen in a pseudo-random fashion,
wherein a corresponding key ID, at least partially based on the new indexed random cryptographic key, is also stored in each of the plurality of cells with the corresponding result, and
wherein the corresponding key ID can be used to determine a corresponding indexed random cryptographic key that is associated with a corresponding one of the one or more cells of the logging database.

17. The method of claim 10, wherein the listing module is further configured to:
decrypt one or more data items, that was encrypted and XORed into the logging database, based on at least the first random cryptographic key;
determine if the one or more data items has been corrupted; and
list all of the one or more data items, that have been decrypted and that has not been corrupted, for transmission to the display or the log file.

18. The method of claim 17, wherein the listing module is further configured to verify when the one or more data items at a given cell is supposed to be stored in the given cell by comparing an expected integrity tag T with an integrity tag stored in the given cell.

19. A method for securely storing and recovering log messages for computing systems, the method comprising:
providing one or more computing systems, each of the one or more computing systems comprising one or more processors and non-transitory computer readable media;
providing at least one computing system of the one or more computing systems with a logging database comprising one or more cells;
initializing each cell of the logging database with a pseudo-random number based at least in part on a first random cryptographic key generated by the initialization module; receiving or generating one or more data items at the at least one computing system;
adding one or more encrypted data items to one or more of the one or more cells of the logging database, wherein the one or more encrypted data items are encrypted by using an indexed random cryptographic key before being added;
decrypting and listing the one or more encrypted data items using the indexed random cryptographic key; and
transmitting unencrypted versions of the one or more encrypted data items from the logging database to a display or a log file in electronic communication with the at least one computing system for user inspection following a crash by the at least one computing system or a breach of the at least one computing system by an adversary system;
wherein the logging database comprises m cells, wherein $m=c-n$, c is a constant greater than one, and n is a given maximum number of data items added into the logging database during a full operation of the addition module; and
wherein each cell of the logging database has a bit-length of $w+4*\lambda$ bits, where w is a maximum bit-length of one or more data items that can be stored in the logging database, and $\lambda$ is a numerical security parameter.

* * * * *